Patented Feb. 11, 1941

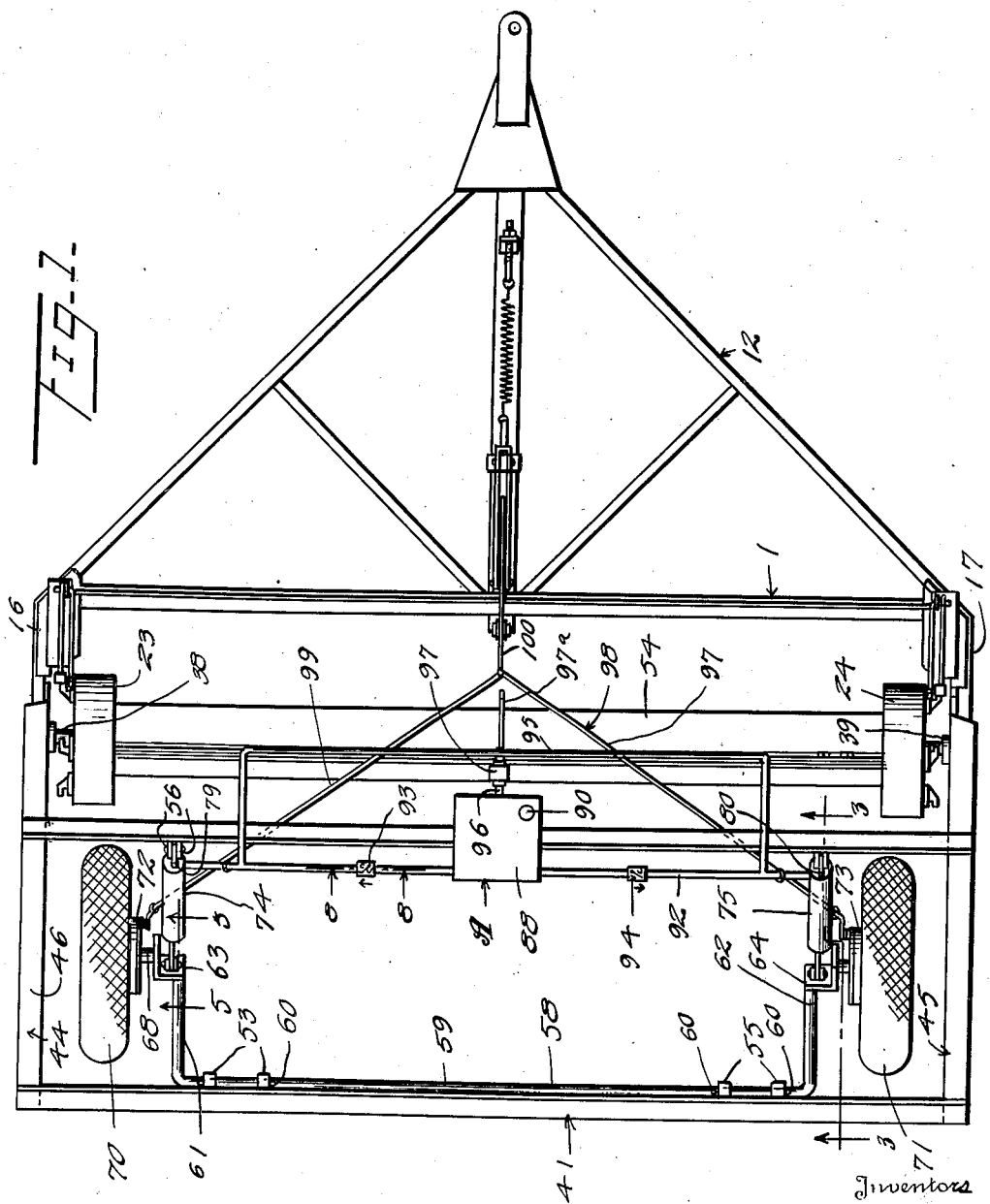

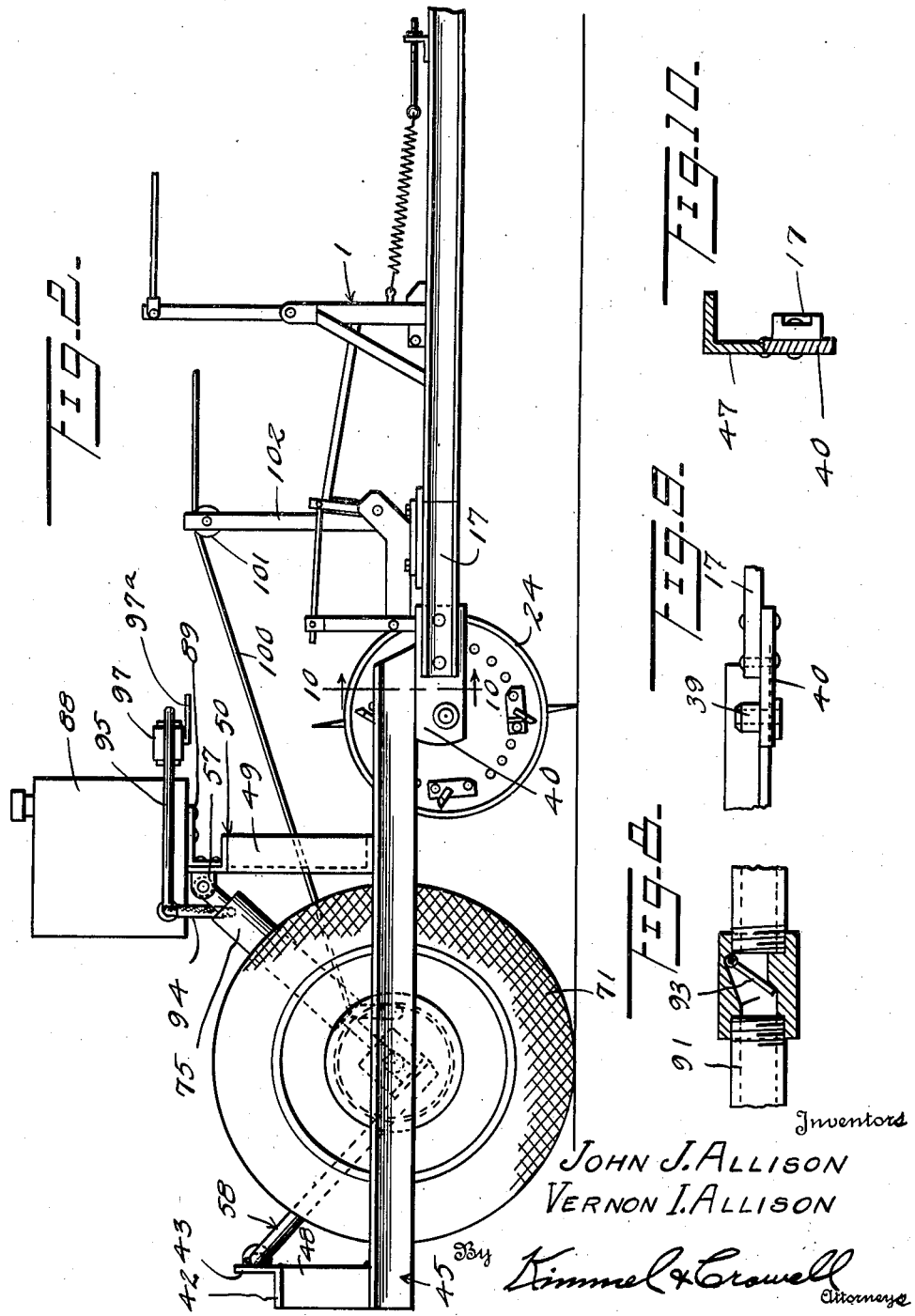

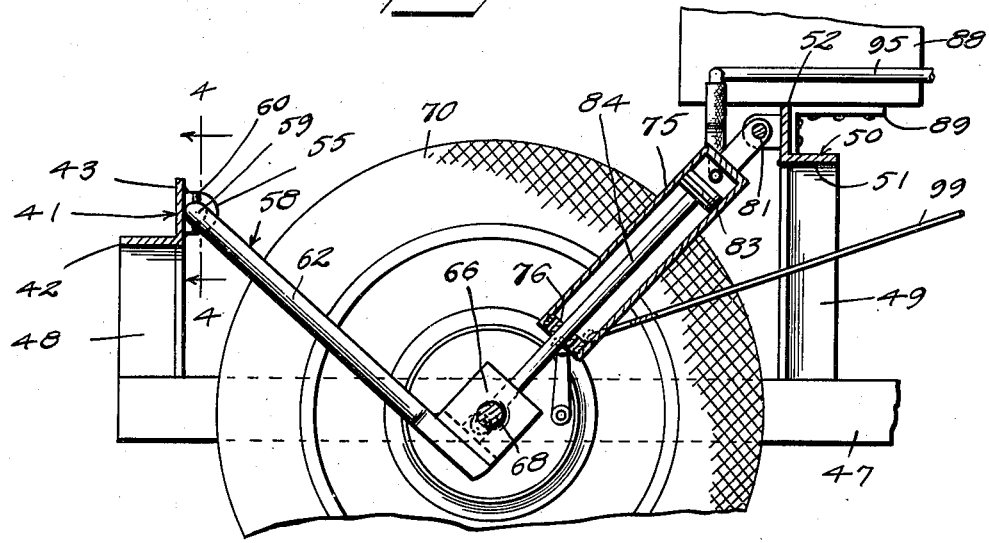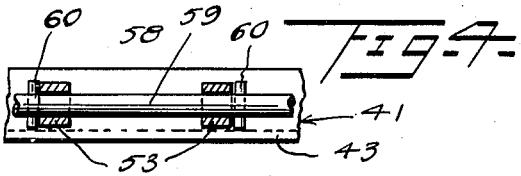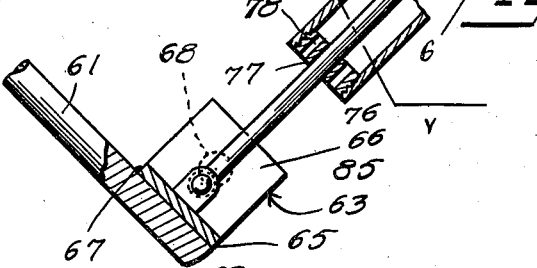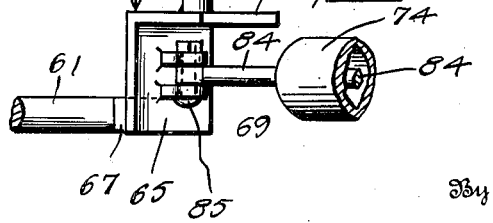

2,231,789

UNITED STATES PATENT OFFICE 2,231,789

LIFTING ATTACHMENT FOR EARTH SURFACING MACHINES

John James Allison and Vernon Irvin Allison, Chandler, Ariz.

Application March 14, 1940, Serial No. 323,980

3 Claims. (Cl. 37—169)

This invention relates to a mobile hydraulically controlled lifting and holding attachment designed primarily for use in connection with an earth surfacing machine of that type including a scraper element or structure for levelling land, making borders in irrigated districts for soil erosion work, cleaning feed pens and barnyards, but it is to be understood that an attachment, in accordance with this invention is for use in connection with any type of ground working machine for which it may be found applicable, such by way of example as plows, subsoilers and large carry-all type scrapers whether such machines be equipped with steel wheels or with pneumatic tired wheels.

The invention aims to provide, in a manner as hereinafter set forth, a mobile attachment for connection with the rear of a ground surfacing machine having a scraper element and with said attachment including a body part, traction wheels connected with the latter and braking mechanisms for the wheels to move said element from engagement with the ground, and with the attachment including spaced hydraulically controlled detents operated on the application of the braking mechanism for holding said body part in its adjusted position.

The invention further aims to provide, in a manner as hereinafter set forth, an attachment for the purpose referred to for releasably maintaining the scraper element or structure in its lifted position.

The invention aims to provide, in a manner as hereinafter set forth, an attachment for the purpose referred to including an adjustable body part having depending forwardly from its rear, a pivoted hanger of yoke-shaped form having its arms connected to a pair of hydraulically controlled detents for releasably holding the body part in adjusted position, and with said arms provided with oppositely disposed spindles carrying traction wheels having correlated therewith braking means, which when applied will result in the elevating of the body part, and with the detents acting on the hanger to releasably hold said body part elevated.

The invention further aims to provide, in a manner as hereinafter set forth, a mobile attachment for the purpose referred to which is comparatively simple in its construction and arrangement, strong, durable, compact, conveniently installed with respect to a ground surfacing machine, thoroughly efficient in its use, automatic in its lifting action, adjustable, releasably sustained in its adjusted position, readily assembled, expeditiously repaired when occasion requires, and comparatively inexpensive to manufacture.

Embodying the aims aforesaid and others which may hereinafter appear, the invention consists of the novel construction, combination and arrangement of parts, as will be more specifically described and illustrated in the accompanying drawings, wherein is shown an embodiment of the invention, but it is to be understood that changes, variations and modifications may be resorted to which fall within the scope of the invention as claimed.

The attachment, in accordance with this invention is illustrated, by way of example installed relative to a ground surfacing machine of the form disclosed by Letters Patent 2,153,446, granted April 4, 1939.

In the drawings:

Figure 1 is a top plan view of the attachment, in accordance with this invention installed with respect to a ground surfacing machine, Figure 2 is a side elevation, broken away at one end of the structure shown by Figure 1, Figure 3 is a section on line 3—3, Figure 1, upon an enlarged scale, Figure 4 is a section on line 4—4 Figure 3, Figure 5 is a section on line 5—5, Figure 1, upon an enlarged scale, Figure 6 is a section on line 6—6 Figure 5, Figure 7 is a fragmentary detail in rear elevation and vertical section, Figure 8 is a section on line 8—8, Figure 1, upon an enlarged scale, Figure 9 is a fragmentary view in inverted plan, and Figure 10 is a section on line 10—10 Figure 2.

With reference to the drawings, 1 generally indicates a form of machine for levelling land and forming borders as disclosed by the Letters Patent aforesaid. The machine 1 includes a scraper element 54 carried by a pair of revoluble carriers 23, 24 journaled in bearing structures 38, 39 secured to supports 40 arranged against the inner faces of and extending rearwardly from the rear terminal portions 16, 17 of the substantially triangular shaped body part 12 of the machine 1. It is thought unnecessary to specifically describe all of the parts of the machine 1 as they form no part of the attachment, in accordance with this invention. The attachment, when installed with respect to the machine 1 is to be secured to the rear end of the latter and as shown the attachment at its front is mounted upon and secured to the supports 40 whereby when traction is applied to the machine 1 the attachment will be carried therewith.

The attachment, generally indicated at A includes a rear horizontally disposed supporting bar 41 of angle-shape in cross section formed of a lower flat leg 42 and a forward vertically disposed leg 43 integral at its bottom with and extending upwardly from the forward side of leg 42, a pair of oppositely disposed side bars 44, 45 of angle-shape in cross section and each consisting of a flat upper leg 46 and a vertically disposed inner leg 47 integral at its top with and depending from the inner side of leg 46. The legs 47 extend forwardly with respect to the forward ends of the legs 46. The forward terminals of the bottoms of the legs 47 are mounted on and secured to the supports 40 of the machine 1. Mounted upon and secured at their lower ends to the rear ends of the legs 46 of the bars 44, 45 are vertically disposed posts 48, of angle-shape cross section which at their upper ends are secured to the terminal portions of the lower face of the leg 42 of bar 41. The posts 48 constitute supports for bar 41. Mounted upon and secured at their lower ends to the legs 46 of the bars 44, 45 are vertically disposed posts 49 of angle-shaped cross section arranged intermediate the ends of bars 44, 45. The posts 49 align with, are of greater height than and oppositely disposed with respect to the posts 48. Secured at its ends upon the upper ends of the posts 49 is a front horizontally disposed supporting bar 50 of angle-shape cross section to form a flat lower leg 51 and a vertically disposed rear leg 52 integral at its bottom with the rear side of leg 51. The leg 51 is secured to the posts 49. The leg 42 of the bar 41 has secured to its front face two spaced pairs of forwardly directed spaced apertured lugs. The lugs of one pair are indicated at 53 and those of the outer pair at 55. The lugs 53 are arranged on bar 41 between the transverse median of the latter and one of its ends. The lugs 55 are disposed on the bar 41 between the transverse median of the latter and the other one of its ends. The pairs of lugs 53, 55 constitute combined coupling and hinge means for a purpose to be referred to. The rear face of the leg 52 of the bar 50 has secured thereto two spaced pairs of rearwardly directed spaced apertured ears. The ears of one pair are indicated at 56 and those of the other pair at 57. The pairs of ears are disposed between the transverse median and the ends of the bar 50. The said ears do not align with and are disposed in outward relation with respect to the lugs. The pairs of ears 56, 57 constitute combined coupling and pivot supporting means for a purpose to be referred to.

The bars 41, 44, 45 and 50 provide the body part of the attachment. The said body part is of frame-like form.

The attachment includes a forwardly extending downwardly inclined yoke-shaped hanger 58 having its bight 59 extending through and hinged to the bar 41 by the lugs 53, 55. The bight 59 is provided with stop pins 60 which correlate with the lugs of each pair for arresting the shifting of the hanger 58 in lengthwise relation with respect to the bar 41. The arms of hanger 58 are indicated at 61, 62 and have secured upon their lower terminal portions angle-shaped carrier members 63, 64 respectively disposed at an angle to said arms. The members 63, 64 are of like form each consisting of a flat rectangular base 65 and an upstanding side 66 corresponding in width to that of the base. The base and the side of each carrier member may be termed a flange. The lower terminal portions of the arms 61, 62 are flattened, as at 67. The bases 65 of the members 63, 64 have the inner terminal portions of their lower faces secured upon the flattened portions 67 of said arms. The members 63, 64 are oppositely disposed and the bases thereof extend outwardly from the lower ends of said arms. The sides 66 are integral with the outer ends of the bases 65 and extend upwardly from the latter. Each of the sides 66 on its outer face is formed with a spindle 68 for a purpose to be referred to. Each of the bases 65 has integral with its upper face a pair of spaced apertured lugs 69 for a purpose to be referred to.

The attachment includes a pair of traction wheels 70, 71 which are shown by way of example as of pneumatic tired type. There is correlated with and carried by the wheels 70, 71 braking mechanisms 72, 73 respectively therefor for simultaneous application to the wheels. The said wheels are mounted on the spindles 68.

The attachment includes a pair of spaced hydraulically controlled detents for correlation with the lifted scraper structure for releasably maintaining the latter in its raised position. The said detents include a pair of rearwardly extending downwardly inclined parallel cylinders 74, 75 closed at their upper ends and having mounted in their lower ends discs 76 formed with axial openings 77 and screened ports 78 surrounding the openings 77. The upper ends of the cylinders 74, 75 are provided with apertured arms 79, 80 respectively, which extend between the lugs of the pairs of lugs 56, 57 respectively. The arms 79, 80 are connected to the said pairs of lugs 56, 57 respectively by the pivot pins 81, 82 respectively, whereby the cylinders 74, 75 are pivotally connected with the leg 52 of the bar 50. Normally disposed in the upper portions of the cylinders 74, 75 are pistons 83 attached to the upper ends of inclined piston rods 84 passing through and extending from the openings 77 to between the pairs of lugs 69 on the bases 65 of the carrier members 63, 64. The piston rods 84 at their lower ends are connected to the lugs 69 by the pivot pins 85.

The attachment includes an oil tank or reservoir 88 which is carried by a bracket 89 secured to the front of the leg 52 of the bar 50. The bracket 89 is arranged centrally of the bar 50, and the tank 88 extends forwardly and rearwardly relative to bar 50. The tank 88 is formed with an air breather 90 of the type including a dust strainer. Extending from the sides of the tank 88 at the lower portion of the latter is a pair of oppositely directed oil conducting pipes 91, 92 formed with oppositely disposed swing check valves 93, 94 respectively of the form shown by Figure 8. The pipes 91, 92 open into the cylinders 74, 75 respectively in proximity to the upper closed ends of the cylinders, that is to say between the pistons 83, 84 and the upper ends of the cylinders. Each of the oil conducting pipes include an intermediate bendable or yieldable stretch 94. The other stretches of each of said pipes are rigid and connected to said intermediate stretch. Common to the pipes 91, 92 is an oil return pipe 95 which opens centrally thereof into a branch pipe 96 leading from pipe 95 and opening into the front of tank 88. The pipe 96 has interposed therein a normally closed spring controlled quick release self closing valve 97 of any suitable form and which is shifted to open position manually by a pull cable 97ª actuated by the operator. The pipe 95 at its ends opens into the pipes 91, 92 between the check valves in the latter and the discharge ends of such pipes.

The attachment includes a means, indicated at 98 for simultaneously applying the braking mechanisms 72, 73 and said means 98 is in the form of a pair of oppositely disposed brake applying members 99, connected to said mechanisms 72, 73 operated by a pull member 100 common thereto and trained over a pulley 101 carried by an upstanding support 102 secured to the machine 1. The pull member 100 is operated by the attendant for the machine during the travel of the machine.

In operation, on the application of the braking mechanisms to the wheels, the wheels are forced backwards and downwards due to the force of friction between them and the ground. The arms or sides of the hanger will then straighten up and thus elevate the frame of the attachment. The detents will then act directly and simultaneously on the arms or sides of the hanger to prevent the shifting of such arms or sides in frame lowering direction until the detents are rendered inactive. As the pistons lower in the cylinders they will cause the oil to enter the cylinders to arrest upward movement of the pistons and retain the scraper structure elevated until the oil is released to flow back into the tank 88. The release of the oil is had by the operator manually opening the valve 97 and which will be held open until the scraper structure has been lowered to active position.

The cable 97ª and member 100 are of a length to extend to the traction means, not shown for the machine and disposed in convenient reach of the operator.

What we claim is:

1. In a wheeled mobile bordering and levelling scraper having a lifting attachment including a liftable frame having a cross bar and a pair of traction wheels, braking mechanisms for said wheels, and means for controlling the attachment to lift the frame, the combination of a yoke-shaped hanger disposed within and pivotally suspended from the frame rearwardly of the cross bar, a pair of spaced aligned simultaneously acting hydraulic detents for arresting the lowering of the frame after the latter has been lifted, said detents positioned within and each adjacent a side of the frame, each detent comprising a cylinder and a piston having a rod extending therefrom, each rod being pivotally connected with one side of the hanger and each cylinder being pivotally connected with said cross bar, a pair of oppositely extending spindles disposed at right angles to and connected with the sides of the hanger, each of said spindles for supporting a traction wheel within the frame, a common fluid source for said detents supported by the cross bar, and a valved fluid control system correlated with said source and detents, for controlling the latter.

2. In a wheeled mobile bordering and levelling scraper having a lifting attachment including a frame having a cross bar, a yoke-shaped hanger pivoted to the frame and a pair of traction wheels, braking mechanisms for said wheels, and means for controlling the attachment, the combination of a pair of hydraulic detents and a pair of angle-shaped carriers each having a pair of flanges, said detents positioned one at each side of the frame and each comprising a cylinder and a piston having a rod extending therefrom, each rod being pivotally connected to one flange of one of the said carriers and said cylinder being pivotally connected to said cross bar, said one flange of each carrier being connected to one arm of said hanger and said other flange of each carrier having connected thereto at right angles a spindle for supporting one of said traction wheels, said detent cylinders having a common fluid source supported by said frame, and a valved fluid control system correlated with said source and detents for controlling the latter.

3. In a wheeled mobile bordering and levelling scraper having a lifting attachment including a frame having a cross bar and a pair of traction wheels, braking mechanisms for said wheels, and means for controlling the attachment, the combination of a yoke-shaped hanger arranged within and having its bight pivotally connected to the rear of said frame, a pair of hydraulic detents, a pair of angle-shaped carriers each having a pair of flanges disposed at right angles to each other, said detents positioned one at each side of the frame and each comprising a cylinder and a piston having a rod extending therefrom, each rod being pivotally connected to one flange of one of the said carriers and each cylinder being pivotally connected to said cross bar, said one flange of each carrier being connected to one arm of said hanger and said other flange of each carrier having connected thereto at right angles a spindle for supporting one of said traction wheels, said detent cylinders having a common fluid source supported by said cross bar, and a valved fluid control system correlated with said source and detents for controlling the latter.

JOHN J. ALLISON.
VERNON I. ALLISON.